United States Patent
Lee

(10) Patent No.: US 8,447,358 B2
(45) Date of Patent: May 21, 2013

(54) MULTI-STANDBY TERMINAL AND METHOD OF PROVIDING TOOL KIT MENU THEREOF

(75) Inventor: Im Ok Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 699 days.

(21) Appl. No.: 12/640,074

(22) Filed: Dec. 17, 2009

(65) Prior Publication Data
US 2010/0159988 A1    Jun. 24, 2010

(30) Foreign Application Priority Data
Dec. 24, 2008   (KR) ........................ 10-2008-0133079

(51) Int. Cl.
*H04B 1/38* (2006.01)

(52) U.S. Cl.
USPC ........................... 455/558; 455/411; 455/500

(58) Field of Classification Search
USPC ......................................................... 455/558
See application file for complete search history.

(56) References Cited

U.S. PATENT DOCUMENTS

| | | | |
|---|---|---|---|
| 6,178,335 B1 * | 1/2001 | Vu ................................ | 455/558 |
| 6,341,228 B1 * | 1/2002 | Hubbe et al. ................... | 455/566 |
| 6,456,857 B1 * | 9/2002 | Bos et al. ...................... | 455/550.1 |
| 6,708,033 B1 * | 3/2004 | Linkola et al. ................. | 455/440 |
| 6,788,956 B2 * | 9/2004 | Bos et al. ...................... | 455/550.1 |
| 7,198,199 B2 * | 4/2007 | Ho ................................ | 235/492 |
| 7,231,372 B1 * | 6/2007 | Prange et al. .................. | 705/67 |
| 7,252,242 B2 * | 8/2007 | Ho ................................ | 235/492 |
| 7,395,973 B2 * | 7/2008 | Ho ................................ | 235/492 |
| 7,506,799 B2 * | 3/2009 | O'Donoghue .................. | 235/375 |
| 7,599,713 B2 * | 10/2009 | Walters et al. ................. | 455/558 |
| 7,769,368 B2 * | 8/2010 | Celik ............................. | 455/415 |
| 7,813,725 B2 * | 10/2010 | Celik ............................. | 455/415 |
| 8,019,818 B2 * | 9/2011 | Lorch et al. ................... | 709/205 |
| 8,045,978 B2 * | 10/2011 | Venkateswarlu ............. | 455/432.1 |
| 8,271,948 B2 * | 9/2012 | Talozi et al. .................. | 717/124 |
| 8,315,198 B2 * | 11/2012 | Corneille et al. ............. | 370/313 |
| 2003/0096604 A1 * | 5/2003 | Vollandt ........................ | 455/419 |
| 2003/0153356 A1 * | 8/2003 | Liu ............................... | 455/558 |
| 2003/0200445 A1 * | 10/2003 | Park .............................. | 713/185 |
| 2004/0131083 A1 * | 7/2004 | Arques et al. ................. | 370/469 |
| 2004/0180657 A1 * | 9/2004 | Yaqub et al. .................. | 455/435.1 |
| 2006/0026676 A1 * | 2/2006 | O'Donoghue ................. | 726/22 |
| 2006/0079254 A1 * | 4/2006 | Hogan .......................... | 455/466 |
| 2006/0080232 A1 * | 4/2006 | Epps ............................. | 705/39 |
| 2006/0081704 A1 * | 4/2006 | Boyd ............................ | 235/382 |
| 2006/0105812 A1 * | 5/2006 | Shin ............................. | 455/558 |
| 2006/0175416 A1 * | 8/2006 | Ho ................................ | 235/492 |
| 2006/0175418 A1 * | 8/2006 | Ho ................................ | 235/492 |
| 2006/0234693 A1 * | 10/2006 | Isidore et al. ................. | 455/422.1 |
| 2006/0234772 A1 * | 10/2006 | Gill et al. ...................... | 455/558 |
| 2007/0131780 A1 * | 6/2007 | Ho ................................ | 235/492 |
| 2007/0178937 A1 * | 8/2007 | Walters et al. ................. | 455/558 |
| 2007/0207798 A1 * | 9/2007 | Talozi et al. .................. | 455/423 |

(Continued)

*Primary Examiner* — Hai Nguyen
(74) *Attorney, Agent, or Firm* — Cha & Reiter, LLC

(57) ABSTRACT

A multi-standby terminal and a method of providing a tool kit menu thereof are provided. The method of providing a tool kit menu of a multi-standby terminal for inserting at least two user identity cards includes: receiving a first tool kit menu list included in a first user identity card; receiving a second tool kit menu list included in a second user identity card; adding an identifier to the second tool kit menu list; and storing the first tool kit menu list and the second tool kit menu list in a storage.

23 Claims, 3 Drawing Sheets

U.S. PATENT DOCUMENTS

| | | | |
|---|---|---|---|
| 2007/0217347 A1* | 9/2007 | Leitgeb et al. | 370/263 |
| 2007/0259663 A1* | 11/2007 | Weintraub et al. | 455/433 |
| 2008/0020755 A1* | 1/2008 | Liu et al. | 455/432.1 |
| 2008/0039050 A1* | 2/2008 | Black et al. | 455/406 |
| 2008/0064443 A1* | 3/2008 | Shin et al. | 455/558 |
| 2008/0090568 A1* | 4/2008 | Venkateswarlu | 455/432.1 |
| 2008/0300008 A1* | 12/2008 | Kim | 455/552.1 |
| 2009/0088211 A1* | 4/2009 | Kim | 455/558 |
| 2009/0093217 A1* | 4/2009 | Shin | 455/67.11 |
| 2009/0227289 A1* | 9/2009 | Celik | 455/558 |
| 2010/0093348 A1* | 4/2010 | Akama | 455/435.1 |
| 2010/0137029 A1* | 6/2010 | Kim | 455/558 |
| 2012/0225690 A1* | 9/2012 | Gomez D Az et al. | 455/558 |

* cited by examiner

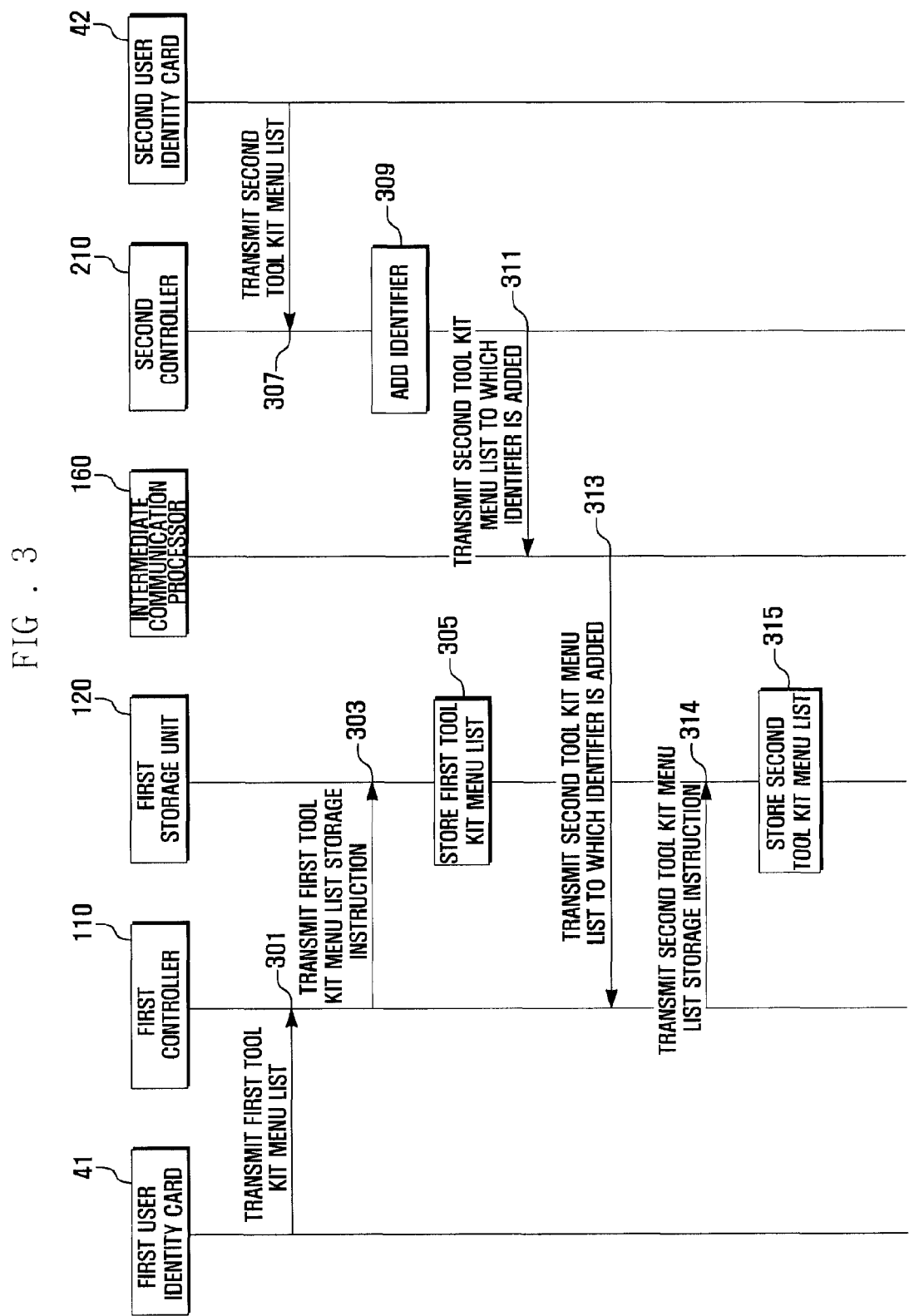

MULTI-STANDBY TERMINAL AND METHOD OF PROVIDING TOOL KIT MENU THEREOF

CLAIM OF PRIORITY

This application claims priority to and the benefit of Korean Patent Application No. 10-2008-0133079 filed in the Korean Intellectual Property Office on Dec. 24, 2008, the entire contents of which are incorporated herein by reference.

BACKGROUND OF THE INVENTION

1. Field of the Invention

The present invention relates to a method of providing a tool kit menu, and more particularly, to a multi-standby terminal and a method of providing a tool kit menu thereof.

2. Description of the Related Art

Modern mobile terminals are equipped with various features, such as a Moving Picture Experts Group layer-3 (MP3) function, mobile broadcasting reception function, moving picture reproduction function, photographing function. Moreover, a multi-standby terminal for performing communication with two or more wireless communication networks is now available. The multi-standby terminal uses two or more user identity cards with a tool kit menu.

Mobile communication providers typically provide a menu (hereinafter, a tool kit menu) for providing their intrinsic services to the user identity card. However, a conventional multi-standby terminal can use only a tool kit menu stored in a user identity card designated as a master card among at least two user identity cards. That is, the conventional multi-standby terminal cannot use all features in the tool kit menus stored in those at least two user identity cards. Accordingly, it is inconvenient for a user to change and swap a user identity card in which a tool kit menu is available to a master card. Therefore, there is a need for using all tool kit menus included in each of the at least two user identity cards without changing the user identity card.

SUMMARY OF THE INVENTION

The present invention has been made in view of the above problems, and provides a multi-standby terminal and a method of providing a tool kit menu thereof that can use all tool kit menus included in each of two user identity cards.

In accordance with an aspect of the present invention, a multi-standby terminal includes: a first slot for receiving a first user identity card having a first tool kit menu; a second slot for receiving a second user identity card having a second tool kit menu; a first controller for receiving a first tool kit menu list from the first user identity card; a second controller for receiving a second tool kit menu list from the second user identity card and adding an identifier to a second tool kit menu list; an intermediate communication processor for transmitting the second tool kit menu list to which an identifier is added to the first controller; and a first storage unit for storing the first tool kit menu list and the second tool kit menu list thereon.

In accordance with another aspect of the present invention, a method of providing a tool kit menu for a multi-standby terminal equipped to receive at least two user identity cards includes: obtaining a first tool kit menu list provided in a first user identity card; obtaining a second tool kit menu list provided in a second user identity card; adding an identifier to the second tool kit menu list; and storing the first tool kit menu list and the second tool kit menu list in a storage.

BRIEF DESCRIPTION OF THE DRAWINGS

The above features and advantages of the present invention will be more apparent from the following detailed description in conjunction with the accompanying drawings, in which:

FIG. 3 is a flowchart illustrating a method of providing a tool kit menu of a multi-standby terminal according to another exemplary embodiment of the present invention.

DETAILED DESCRIPTION OF THE INVENTION

Figure 1:
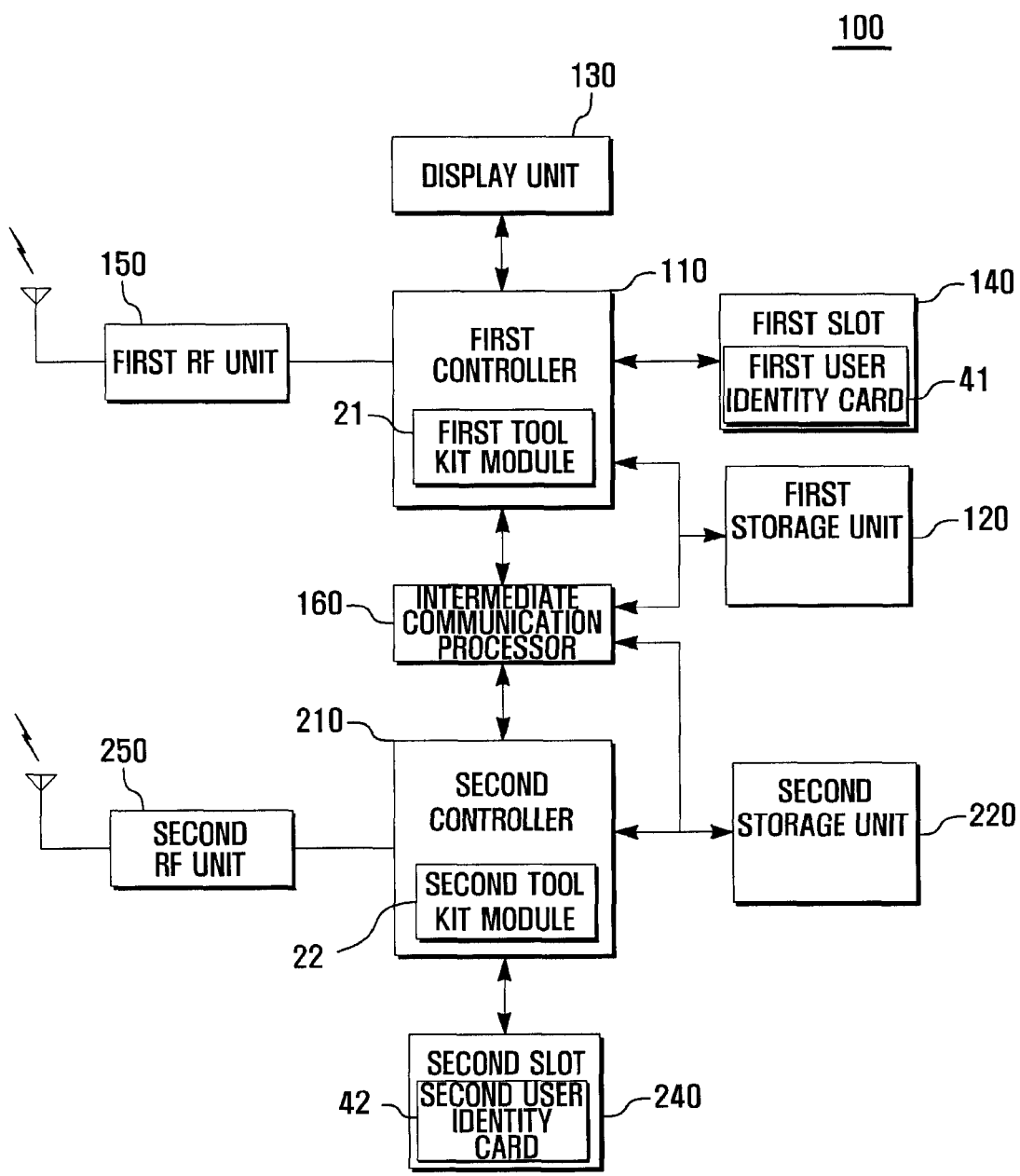
FIG. 1 is a block diagram illustrating a configuration of a multi-standby terminal according to an exemplary embodiment of the present invention.

Hereinafter, exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. For the purposes of clarity and simplicity, detailed descriptions of well-known functions and structures incorporated herein may be omitted to avoid obscuring the subject matter of the present invention.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

In the following description, a "tool kit menu" represents a menu included and provided in a user identity card in order to use a service provided by a mobile communication provider.

A "user identity card" indicates a card with a tool kit menu for storing personal information to provide services, such as a subscriber's certification, accounting, and security function, and may be one of a subscriber identity module (SIM), universal subscriber identity module (USIM), and user identity module (UIM).

A "tool kit module" is a device for performing communication with a user identity card and receives a tool kit menu list from the user identity card upon booting.

Figure 2A:
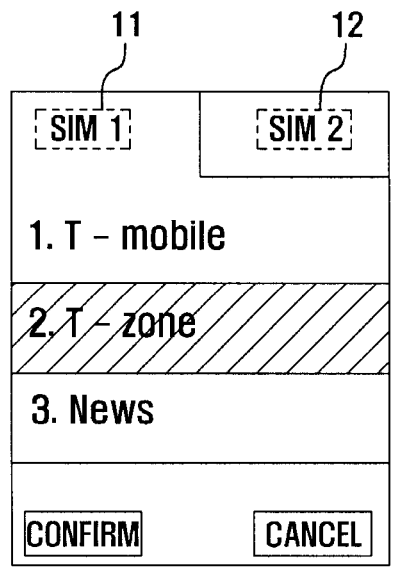
FIGS. 2A and 2B illustrate examples of screens of the multi-standby terminal of FIG. 1.
Figure 2B:
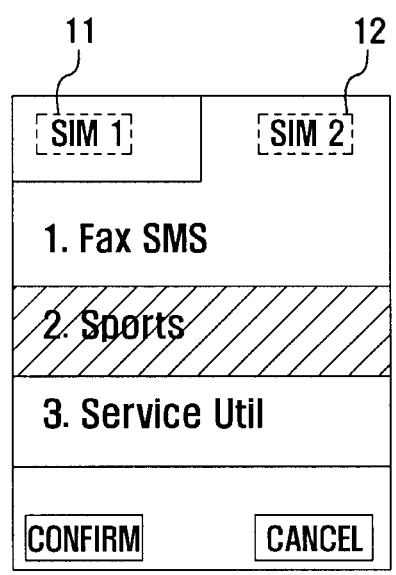

FIG. 1 is a block diagram illustrating a configuration of a multi-standby terminal according to an exemplary embodiment of the present invention, and FIGS. 2A and 2B illustrate examples of screens of the multi-standby terminal of FIG. 1.

The multi-standby terminal includes two communication devices and can simultaneously use two wireless communication services. Note that the first and second wireless communication networks may be using the same or different communication protocols.

Referring to FIGS. 1, and 2A to 2B, a multi-standby terminal 100 includes a first controller 110, first storage unit 120, display unit 130, first slot 140, first radio frequency (RF) unit 150, intermediate communication processor 160, second controller 210, second storage unit 220, second slot 240, and second RF unit 250.

The first slot 140 is provided for inserting a first user identity card 41 and performs an interface in relation to the first user identity card 41 and the first controller 110. The first user identity card 41 includes a first tool kit menu and may be a SIM, USIM, and UIM.

The second slot 240 is provided for inserting a second user identity card 42 and performs an interface in relation to the second user identity card 42 and the second controller 210. The second user identity card 42 may be a SIM, USIM, and UIM and includes a second tool kit menu.

The first storage unit 120 stores a program necessary for performing general operations of the multi-standby terminal 100, an operating system for booting the multi-standby terminal 100, a program necessary for performing communication with the first wireless communication network, and data generated while performing the program. Particularly, in the present exemplary embodiment, the first storage unit 120 stores a first tool kit menu list and a second tool kit menu list. It is preferable that the second tool kit menu list includes an identifier, which serves to distinguish the first tool kit menu list from the second tool kit menu list. Absence of this identifier would cause an error (for example, lock-up).

Similarly, the second storage unit 220 stores a program necessary for performing communication with the second wireless communication network and data generated while performing the program. The first storage unit 120 and the second storage unit 220 are formed with at least one volatile memory element and non-volatile memory element. In the present exemplary embodiment, the first storage unit 120 and the second storage unit 220 are described as a separate element, however the first storage unit 120 and the second storage unit 220 may be integrated as a single memory in an alternate embodiment.

In operation, the display unit 130 displays various menu screens of the multi-standby terminal 100, user data input by a user, function setting information, or various information provided to a user. When the display unit 130 is formed as a touch screen, the display unit 130 can be operated as an input means. The display unit 130 may be one of a liquid crystal display (LCD) and an organic light emitting diode (OLED). Particularly, in the present exemplary embodiment, the display unit 130 displays the first tool kit menu list and the second tool kit menu list under the control of the first controller 110. For example, as shown in FIGS. 2A and 2B, the display unit 130 displays to distinguish the first tool kit menu list and the second tool kit menu list. As shown, the display unit 130 displays a first index 11 and a second index 12 corresponding to the first user identity card 41 and the second user identity card 42, respectively, and displays a tool kit menu list in a lower part of the index. Accordingly, when the first index 11 is selected, the display unit 130 displays the first tool kit menu list, and when the second index 12 is selected, the display unit 130 displays the second tool kit menu list.

As shown in FIGS. 2A and 2B, the first tool kit menu list and the second tool kit menu list are displayed to distinguish from each other, however, the present invention is not limited thereto. For example, the display unit 130 may be displayed with different character colors or background colors to distinguish the first tool kit menu and the second tool kit menu.

The first controller 110 controls general operations of the multi-standby terminal 100 and a signal flow between units of the multi-standby terminal 100. The first controller 110 may be a main controller. Particularly, in the present exemplary embodiment, when the multi-standby terminal 100 is booted or when insertion of the first user identity card 41 is detected, the first controller 110 determines whether the first user identity card 41 includes the first tool kit menu by performing communication with the first user identity card 41 inserted into the first slot 140. To this end, the first controller 110 is provided with a first tool kit module 21.

The first tool kit module 21 is provided for performing communication with the first user identity card 41, and when the multi-standby terminal 100 is booted or when an insertion of the first user identity card 41 is detected, the first tool kit module 21 receives a first tool kit menu list from the first user identity card 41 and stores the first tool kit menu list as a global variable in the first storage unit 120.

The first controller 110 receives a second tool kit menu list included in the second user identity card 42 through the intermediate communication processor 160 and controls to store the second tool kit menu list in the first storage unit 120. The second tool kit menu list preferably includes an identifier for distinguishing from the first tool kit menu list and is stored as a global variable together with the first tool kit menu list in the first storage unit 120 under the control of the first controller 110.

The second controller 210 is a sub-controller of the multi-standby terminal 100. When the multi-standby terminal 100 is booted or when insertion of the second user identity card 42 is detected, the second controller 210 determines whether the second user identity card 42 includes a second tool kit menu. To this end, the second controller 210 is provided with a second tool kit module 22.

The second tool kit module 22 is provided for performing communication with the second user identity card 42, and when the multi-standby terminal 100 is booted or when insertion of the second user identity card 42 is detected, the second tool kit module 22 receives the second tool kit menu list from the second user identity card 42. Thereafter, the second tool kit module 22 transmits the second tool kit menu list to the first storage unit 120 through the intermediate communication processor 160 under the control of the second controller 210. The second controller 210 may add an identifier to the second tool kit menu list.

The intermediate communication processor 160 is provided for enabling the first controller 110 and the second controller 210 to transmit and receive data. The intermediate communication processor 160 uses a dual ported RAM (DPRAM) and serves to transmit a second tool kit menu list received from the second tool kit module 22 to the first storage unit 120. Further, the intermediate communication processor 160 transmits a second tool kit menu execution request signal received from the first controller 110 to the second tool kit module 22. This is because the first controller 110 and the second controller 210 use different flat forms, thus the first controller 110 cannot control to execute the second tool kit menu stored in the second user identity card 42.

The first RF unit 150 transmits and receives a wireless signal with a first wireless communication network for providing a communication service with a first wireless communication protocol. For example, the first RF unit 150 modulates a signal output from the first controller 110, up-converts a frequency of the signal, and transmits the signal through an antenna, or down-converts a frequency of a wireless signal received through the antenna, demodulates the wireless signal, and transmits the wireless signal to the first controller 110. When a first tool kit menu is executed, the first RF unit 150 transmits and receives data to and from the first wireless communication network. For example, when a wireless Internet service is used through the first wireless communication network, the first RF unit 150 forms a communication channel with the first wireless communication network.

Similarly, the second RF unit 250 transmits and receives a wireless signal to and from a second wireless communication network for providing a communication service with a second wireless communication protocol. The second RF unit 250 modulates a signal output from the second controller 210 up-converts a frequency of the signal, and transmits the signal through an antenna, or down-converts a frequency of a wireless signal received through the antenna, demodulates the wireless signal, and transmits the wireless signal to the second controller 210. In operation, when a second tool kit menu is executed, the second RF unit 250 transmits and receives data to and from the second wireless communication network. For example, when a wireless Internet service is used through the second wireless communication network, the second RF unit 250 forms a communication channel with the second wireless communication network.

In the present exemplary embodiment, the first RF unit 150 and the second RF unit 250 each have an antenna, however the present invention is not limited thereto. That is, the first RF unit 150 and the second RF unit 250 may share a common antenna. In this case, the multi-standby terminal 100 includes a duplexer or a diplexer for separating a frequency band of the first RF unit 150 and the second RF unit 250.

Although not shown, the multi-standby terminal 100 may further include constituent elements having an additional function, such as a camera module for an image or moving picture photographing, a short range communication module for short range wireless communication, a sound signal output device such as a speaker, a sound signal input device such as a microphone, and a digital sound source reproduction module such as an MP3 module.

As the multi-standby terminal 100 having the above-described configuration can use all tool kit menus included in the first user identity card 41 and the second user identity card 42, it is unnecessary to set a specific user identity card as a master card as in the prior art in order to use a tool kit menu stored in the specific user identity card. Thus, the multi-standby terminal 100 according to the teachings of the present invention improves user conveniences using a tool kit menu.

A method of providing a tool kit menu of a multi-standby terminal 100 according to another exemplary embodiment of the present invention is described hereinafter.

FIG. 3 is a flowchart illustrating a method of providing a tool kit menu of the multi-standby terminal 100 according to another exemplary embodiment of the present invention.

In the present exemplary embodiment, a first user identity card 41 including a first tool kit menu and a second user identity card 42 including a second tool kit menu are inserted into the multi-standby terminal 100.

Referring to FIGS. 1 to 3, the first user identity card 41 transmits a first tool kit menu list to the first controller 110 (301). The first controller 110 includes a first tool kit module 21 in order to perform communication with the first user identity card 41.

The first controller 110 transmits a first tool kit menu list storage instruction to the first storage unit 120 (303). The first storage unit 120 stores a first tool kit menu list (305). In this case, the first tool kit menu list is stored as a global variable.

The second user identity card 42 transmits a second tool kit menu list to the second controller 210 (307). The second controller 210 includes a second tool kit module 22 to perform communication with the second user identity card 42. The second controller 210 adds an identifier to the second tool kit menu list (309). The identifier is used for distinguishing the second tool kit menu list from the first tool kit menu list.

The second controller 210 transmits the second tool kit menu list to which the identifier is added to the intermediate communication processor 160 (311). The intermediate communication processor 160 is an intermediary for enabling the first controller 110 and the second controller 210 having different platforms to perform communication and uses a dual ported RAM (random-access memory).

The intermediate communication processor 160 transmits a second tool kit menu list to which the identifier is added to the first controller 110 (313). The first controller 110 transmits a second tool kit menu list storage instruction to which the identifier is added to the first storage unit 120 (314).

The first storage unit 120 stores the second tool kit menu list (315). In this case, the second tool kit menu list to which the identifier is added is stored as a global variable, as in the first tool kit menu list. The above-described process is performed when the multi-standby terminal 100 is booted or when insertion of the first user identity card 41 and the second user identity card 42 is detected.

Although not shown, when a menu key is input, the first controller 110 controls the display unit 130 to display a first tool kit menu list and a second tool kit menu list. The display unit 130 displays to distinguish the first tool kit menu list and the second tool kit menu list. For this, the display unit 130 differently displays at least one of a character color and a background color of the first tool kit menu list and the second tool kit menu list. Alternatively, the display unit 130 may display a first index 11 and a second index 12 corresponding to the first user identity card 41 and the second user identity card 42, respectively, and display a tool kit menu list corresponding to the first index 11 or the second index 12 at the lower side of the indexes 11 and 12. Hence, when the first index 11 is selected, the display unit 130 displays the first tool kit menu list, and when the second index 12 is selected, the display unit 130 displays the second tool kit menu list.

In the present exemplary embodiment, a process of storing a first tool kit menu list is first performed before storing a second tool kit menu list, but can be performed simultaneously or the storing of the second tool kit menu list can be performed first prior to storing of the second tool kit menu list.

In a method of providing a tool kit menu according to the present invention having the above-described configuration, because all tool kit menus included in the first user identity card 41 and the second user identity card 42 can be used, it is unnecessary to set a specific user identity card as a master card as in the prior art in order to use a tool kit menu stored in the specific user identity card.

The above-described methods according to the present invention can be realized in hardware or as software or computer code that can be stored as machine readable code in a medium such as a ROM, an RAM, a floppy disk, a hard disk, a flash memory, or a magneto-optical disk, or downloaded over a network, so that the methods described herein can be rendered in such software using a general purpose microprocessor, general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A method of providing a tool kit menu for a multi-standby terminal equipped to receive at least two user identity cards, comprising:
    obtaining a first tool kit menu list provided in a first user identity card;

obtaining a second tool kit menu list provided in a second user identity card;

assigning an identifier to at least one of the first tool kit menu list and the second tool kit menu list to distinguish those of the tool kit menu lists; and storing the first tool kit menu list and the second tool kit menu list assigned the identifier in a storage.

2. The method of claim 1, further comprising, when a request for displaying the tool kit menu is received, distinguishably displaying the first tool kit menu list and the second tool kit menu list.

3. The method of claim 2, wherein the first tool kit menu list is distinguishably displayed from the second tool kit menu list by at least one of different character color and different background color.

4. The method of claim 2, wherein displaying the first tool kit menu list and the second tool kit menu list comprises:

displaying a first index and a second index corresponding to the first user identity card and the second user identity card, respectively; and displaying a tool kit menu list corresponding to an index selected from the first index and the second index.

5. The method of claim 1, further comprising displaying the first tool kit menu in a first window, and displaying the second tool kit menu in a second window.

6. The method of claim 1, wherein obtaining the first tool kit menu list included in a first user identity card is performed when the multi-standby terminal is booted or when an insertion of the first user identity card is detected thereon, and obtaining the second tool kit menu list included in a second user identity card is performed when the multi-standby terminal is booted or when an insertion of the second user identity card is detected thereon.

7. The method of claim 1, wherein the first tool kit menu list is stored before storing the second tool kit menu list in the storage.

8. The method of claim 1, wherein the second tool kit menu list is stored before storing the first tool kit menu list in the storage.

9. The method of claim 1, wherein storing of the first tool kit menu list and the second tool kit menu list are performed simultaneously in the storage.

10. A multi-standby terminal comprising:

a first slot for receiving a first user identity card having a first tool kit menu;

a second slot for receiving a second user identity card having a second tool kit menu;

a first controller for receiving a first tool kit menu list from the first user identity card;

a second controller for receiving a second tool kit menu list from the second user identity card and assigning an identifier to the second tool kit menu list to distinguish the first tool kit menu list and the second tool kit menu list;

an intermediate communication processor for transmitting the second tool kit menu list to which the identifier is added to the first controller; and a first storage unit for storing the first tool kit menu list and the second tool kit menu list assigned the identifier thereon.

11. The multi-standby terminal of claim 10, further comprising a display unit for displaying, when a request for displaying the tool kit menu is received, the first tool kit menu list and the second tool kit menu list thereon.

12. The multi-standby terminal of claim 11, wherein the display unit distinguishably displays the first tool kit menu list and the second tool kit menu list.

13. The multi-standby terminal of claim 12, wherein the display unit displays different character color or different background color for the first tool kit menu list and the second tool kit menu list to distinguish from each other.

14. The multi-standby terminal of claim 12, wherein the display unit displays a first index and a second index corresponding to the first user identity card and the second user identity card, respectively, and displays the tool kit menu list corresponding to the first index or the second index.

15. The multi-standby terminal of claim 11, wherein the first tool kit menu is displayed in a first window of the display unit, and the second tool kit menu is displayed in a second window of the display unit.

16. The multi-standby terminal of claim of claim 10, wherein the first tool kit menu list is stored before storing of the second tool kit menu list in the storage.

17. The multi-standby terminal of claim 10, wherein the second tool kit menu list is stored before storing of the first tool kit menu list in the storage.

18. The multi-standby terminal of claim 10, wherein the first tool kit menu list and the second tool kit menu list are stored simultaneously in the storage.

19. The multi-standby terminal of claim 10, wherein the first controller comprises a first tool kit module for performing communication with the first user identity card and receiving the first tool kit menu list, and the second controller comprises a second tool kit module for performing communication with the second user identity card and receiving the second tool kit menu list.

20. The multi-standby terminal of claim 10, wherein the first user identity card and the second user identity card are one of a subscriber identity module (SIM), universal subscriber identity module (USIM), and user identity module (UIM).

21. A method of providing a tool kit menu for a multi-standby terminal having a first user identity card, comprising:

detecting a second user identity card newly inserted into the multi-standby terminal having the first user identity card;

obtaining a second tool kit menu list provided in the second user identity card;

assigning an identifier to the second tool kit menu list to distinguish from the first tool kit menu list; and storing the second tool kit menu list assigned the identifier in a storage the first tool kit menu list is previously stored.

22. The method of claim 21, further comprising:

detecting another user identity card newly inserted into the multi-standby terminal having the first user identity card and the second user identity card;

obtaining another tool kit menu list provided in the other user identity card;

assigning an identifier to the other tool kit menu list to distinguish from the first tool kit menu list and the second tool kit menu list; and storing the other tool kit menu list assigned the identifier in the storage in which the first tool kit menu list and the second tool kit menu list are previously stored.

23. The method of claim 22, wherein the identifier assigned the other tool kit menu list is different from the identifier which is previously assigned to the second tool kit menu list.

* * * * *